US009858306B2

(12) United States Patent
Shetty et al.

(10) Patent No.: US 9,858,306 B2
(45) Date of Patent: *Jan. 2, 2018

(54) ARCHIVING TO A SINGLE DATABASE TABLE INFORMATION LOCATED ACROSS MULTIPLE TABLES

(71) Applicant: International Business Machines Corporation, Armonk, NY (US)

(72) Inventors: Sridhar Shetty, Duluth, GA (US); Sugantha Subbiah, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/397,827

(22) Filed: Jan. 4, 2017

(65) Prior Publication Data

US 2017/0116243 A1    Apr. 27, 2017

Related U.S. Application Data

(63) Continuation of application No. 14/922,259, filed on Oct. 26, 2015, now Pat. No. 9,588,973, which is a continuation of application No. 12/370,655, filed on Feb. 13, 2009, now Pat. No. 9,218,347.

(51) Int. Cl.
*G06F 17/30* (2006.01)
*G06F 12/14* (2006.01)

(52) U.S. Cl.
CPC .... *G06F 17/30339* (2013.01); *G06F 12/1408* (2013.01); *G06F 12/1458* (2013.01); *G06F 17/30073* (2013.01); *G06F 17/30315* (2013.01); *G06F 17/30477* (2013.01); *G06F 2212/163* (2013.01); *G06F 2212/402* (2013.01)

(58) Field of Classification Search
CPC ................................. G06F 17/30073
See application file for complete search history.

(56) References Cited

U.S. PATENT DOCUMENTS

| 5,778,395 A | 7/1998 | Whiting et al. |
| 7,284,017 B2 | 10/2007 | Baune |
| 9,218,347 B2 | 12/2015 | Shetty et al. |
| 2006/0143253 A1 | 6/2006 | Peterson et al. |

(Continued)

OTHER PUBLICATIONS

Gruenwald L. et al. "MMDB Reload Concerns." Journal: Information Sciences, 1994. vol. 76, Issues 1-2. pp. 151-176.

(Continued)

*Primary Examiner* — Kris Mackes
(74) *Attorney, Agent, or Firm* — Schmeiser, Olsen & Watts, LLP; Lisa Ulrich

(57) ABSTRACT

A method, and associated system, for archiving to a single database table information located across multiple database tables. A threshold number of times specified by the end user and a period of time specified by the end user are received. At least one archival data value is identified. Each archival data value corresponds to a unique data value of at least one data value residing in a table of the multiple database tables. A determination is made that the specified threshold number of times has not been exceeded, within the specified period of time, by a number of times each archival data value has been moved within the multiple database tables. At least one archive file in the single database table is stored. Each archive file of the at least one archive file includes the at least one archive data value.

20 Claims, 4 Drawing Sheets

(56) References Cited

U.S. PATENT DOCUMENTS

| | | |
|---|---|---|
| 2006/0251073 A1 | 11/2006 | Lepel et al. |
| 2006/0259160 A1 | 11/2006 | Hood et al. |
| 2007/0124345 A1 | 5/2007 | Heinz et al. |
| 2007/0198570 A1 | 8/2007 | Prahlad et al. |
| 2008/0104146 A1 | 5/2008 | Schwaab et al. |
| 2008/0162601 A1 | 7/2008 | Chen et al. |
| 2008/0168110 A1 | 7/2008 | Hagiwara |
| 2008/0243959 A1 | 10/2008 | Bacastow et al. |
| 2010/0211549 A1 | 8/2010 | Shetty et al. |
| 2016/0048523 A1 | 2/2016 | Shetty et al. |

OTHER PUBLICATIONS

Author: IBM. "Method, Process and Framework Supporting Long Term Preservation of Data." IP.com PriorArtDatabase. Technical Disclosure. IPCOM000034883D. US. Pub. Date: Jan. 19, 2005. 4 pages.

"PDF as a Standard for Archiving." (White Paper). Adobe Systems Inc. [online]. 11 pages. [retrieved on Oct. 17, 2008]. Retrieved from the Internet: URL: http://www.adobe.com/enterprise/pdfs/pdfarchiving.pdf>.

Salzberg B. et al. "Comparison of Access Methods for Time-Evolving Data." Journal: ACM Computing Surveys, vol. 31, No. 2, Jun. 1999. pp. 158-221.

Notice of Allowance (dated Aug. 6, 2015) for U.S. Appl. No. 12/370,655, filed Feb. 13, 2009, Conf. No. 6118.

Reply Brief (dated Oct. 9, 2012) for U.S. Appl. No. 12/370,655, filed Feb. 13, 2009, Conf. No. 6118.

Examiner's Answer (dated Aug. 16, 2012) for U.S. Appl. No. 12/370,655, filed Feb. 13, 2009, Conf. No. 6118.

Appeal Brief (dated May 7, 2012) for U.S. Appl. No. 12/370,655, filed Feb. 13, 2009, Conf. No. 6118.

Notice of Appeal (dated Mar. 5, 2012) for U.S. Appl. No. 12/370,655, filed Feb. 13, 2009, Conf. No. 6118.

Advisory Action (dated Feb. 15, 2012) for U.S. Appl. No. 12/370,655, filed Feb. 13, 2009, Conf. No. 6118.

Final Response (dated Jan. 31, 2012) for U.S. Appl. No. 12/370,655, filed Feb. 13, 2009, Conf. No. 6118.

Final Office Action (dated Dec. 7, 2011) for U.S. Appl. No. 12/370,655, filed Feb. 13, 2009, Conf. No. 6118.

Response (dated Sep. 21, 2011) for U.S. Appl. No. 12/370,655, filed Feb. 13, 2009, Conf. No. 6118.

Office Action (dated Jun. 21, 2011) for U.S. Appl. No. 12/370,655, filed Feb. 13, 2009, Conf. No. 6118.

Office Action (dated Mar. 14, 2016) for U.S. Appl. No. 14/922,259, filed Oct. 26, 2015, Conf. No. 1076.

Amendment (dated Jun. 13, 2016) for U.S. Appl. No. 14/922,259, filed Oct. 26, 2015, Conf. No. 1076.

Final Office Action (dated Jul. 18, 2016) for U.S. Appl. No. 14/922,259, filed Oct. 26, 2015, Conf. No. 1076.

Final Amendment (dated Sep. 19, 2016) for U.S. Appl. No. 14/922,259, filed Oct. 26, 2015, Conf. No. 1076.

Advisory Action (dated Oct. 14, 2016) for U.S. Appl. No. 14/922,259, filed Oct. 26, 2015, Conf. No. 1076.

PA and RCE (dated Oct. 18, 2016) for U.S. Appl. No. 14/922,259, filed Oct. 26, 2015, Conf. No. 1076.

Notice of Allowance (dated Oct. 26, 2016) for U.S. Appl. No. 14/922,259, filed Oct. 26, 2015, Conf. No. 1076.

ARCHIVING TO A SINGLE DATABASE TABLE INFORMATION LOCATED ACROSS MULTIPLE TABLES

This application is a continuation application claiming priority to Ser. No. 14/922,259, filed Oct. 26, 2015, now U.S. Pat. No. 9,588,973 issued Mar. 7, 2017, which is a continuation to Ser. No.12/370,655, filed Feb. 13, 2009, U.S. Pat. No. 9,218,347, issued Dec. 22, 2015.

BACKGROUND OF THE INVENTION

The present invention relates generally to data archiving, and more particularly to archiving to a single database table information located across multiple database tables.

Over time databases fill with infrequently accessed and/or outdated information. The infrequently accessed/outdated information can needlessly increase demands on network resources, slow application performance, and increase the time required to back up databases.

Conventional archival solutions identify at least one database containing data no longer being accessed regularly and move the data to an archive where it remains available for reference. Traditionally, the archived data is stored in its original format, thus the archive solution must be able to accommodate the same volume of information as the database from which the infrequently accessed/outdated data originates.

Moreover since the archived data is stored in its original format, the archival solution must be able to accommodate a plurality of file formats.

SUMMARY OF THE INVENTION

The present invention provides a method for archiving to a single database table information located across multiple database tables, said single database table being an archive table, each table of said multiple database tables being an active table, said method comprising:

monitoring at least one data value, each data value of said at least one data value residing in a table of said multiple database tables;

identifying, by a processor, at least one archival data value, each archival data value of said at least one archival data value corresponding to a unique data value of said at least one data value, each archival data value of said at least one archival data value not exceeding a threshold;

storing at least one archive file in said single database table, each archive file of said at least one archive file comprising said at least one archive data value; and removing from said multiple database tables each archival data value of said at least one archival data value.

Furthermore, the present invention provides a computer program product comprising:

a computer-usable storage medium having a computer-readable program code stored therein, said computer-readable program code containing instructions that when executed by a processor of a computer system implement a method for archiving to a single database table information located across multiple database tables, said single database table being an archive table, each table of said multiple database tables being an active table, said method comprising:

monitoring at least one data value, each data value of said at least one data value residing in a table of said multiple database tables;

identifying, by a processor, at least one archival data value, each archival data value of said at least one archival data value corresponding to a unique data value of said at least one data value, each archival data value of said at least one archival data value not exceeding a threshold;

storing at least one archive file in said single database table, each archive file of said at least one archive file comprising said at least one archive data value; and removing from said multiple database tables each archival data value of said at least one archival data value.

Additionally, the present invention provides a computing system comprising:

a processor coupled to a computer-readable memory unit, said memory unit comprising a software application, said software application comprising instruction that when executed by said processor, implement a method for archiving to a single database table information located across multiple database tables, said single database table being an archive table, each table of said multiple database tables being an active table, said method comprising:

monitoring at least one data value, each data value of said at least one data value residing in a table of said multiple database tables;

identifying, by a processor, at least one archival data value, each archival data value of said at least one archival data value corresponding to a unique data value of said at least one data value, each archival data value of said at least one archival data value not exceeding a threshold;

storing at least one archive file in said single database table, each archive file of said at least one archive file comprising said at least one archive data value; and removing from said multiple database tables each archival data value of said at least one archival data value.

Finally, the present invention provides a process for supporting computer infrastructure, said process comprising:

providing at least one support service for at least one of creating, integrating, hosting, maintaining, and deploying computer-readable code in a computing system, wherein said code in combination with the computing system is capable of implementing a method for archiving to a single database table information located across multiple database tables, said single database table being an archive table, each table of said multiple database tables being an active table, said method comprising:

monitoring at least one data value, each data value of said at least one data value residing in a table of said multiple database tables;

identifying, by a processor, at least one archival data value, each archival data value of said at least one archival data value corresponding to a unique data value of said at least one data value, each archival data value of said at least one archival data value not exceeding a threshold;

storing at least one archive file in said single database table, each archive file of said at least one archive file comprising said at least one archive data value; and removing from said multiple database tables each archival data value of said at least one archival data value.

DETAILED DESCRIPTION OF THE DRAWINGS

Definitions

The term 'information' as used herein means at least one data value.

The term 'active table' as used herein means a set of data values organized using columns and rows; said set of data values being readable, writable, and/or modifiable.

The term 'archive table' as used herein means a set of data values organized using columns and rows; said set of data values being only readable and not modifiable.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
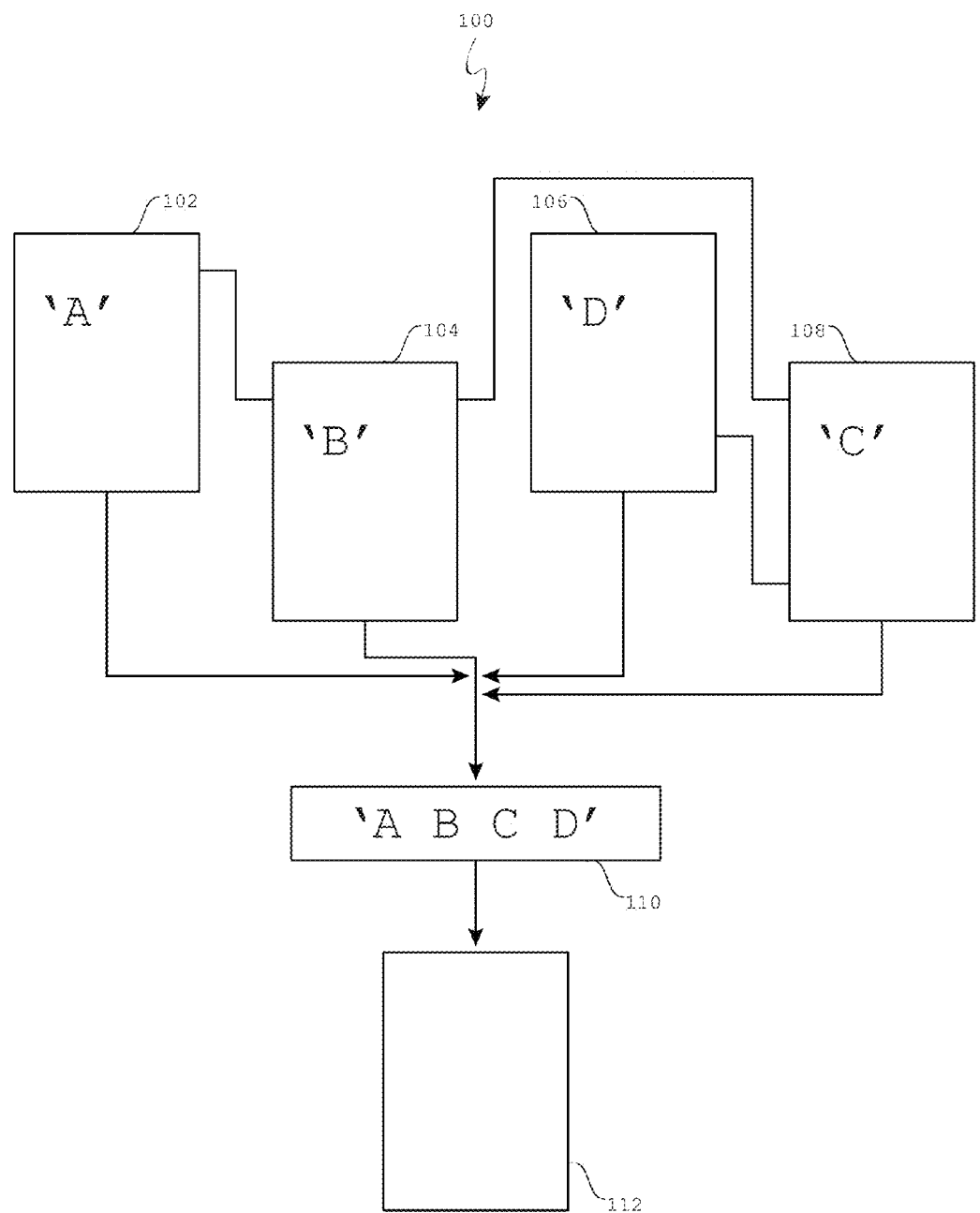
FIG. 1 illustrates an example of how the present invention archives to a single database table information located across multiple tables, in accordance with embodiments of the present invention.

FIG. 1 illustrates an example 100 of how the present invention archives to a single database table 112 information located across multiple tables 102 through 108, in accordance with embodiments of the present invention.

The example 100 comprises at least one active table 102 through 108 where each active table therein comprises discrete data values (e.g. 'A', 'B', 'C', and 'D'). As the data values residing within the active tables 102 through 108 become infrequently accessed and/or outdated, the present invention stores said data values in a single file 110. The single file is then stored in a single database table 112, also known as an archive table. The archival table 112 comprises all infrequently accessed and/or outdated data values previously residing in the active tables 102 through 108.

Figure 2A:
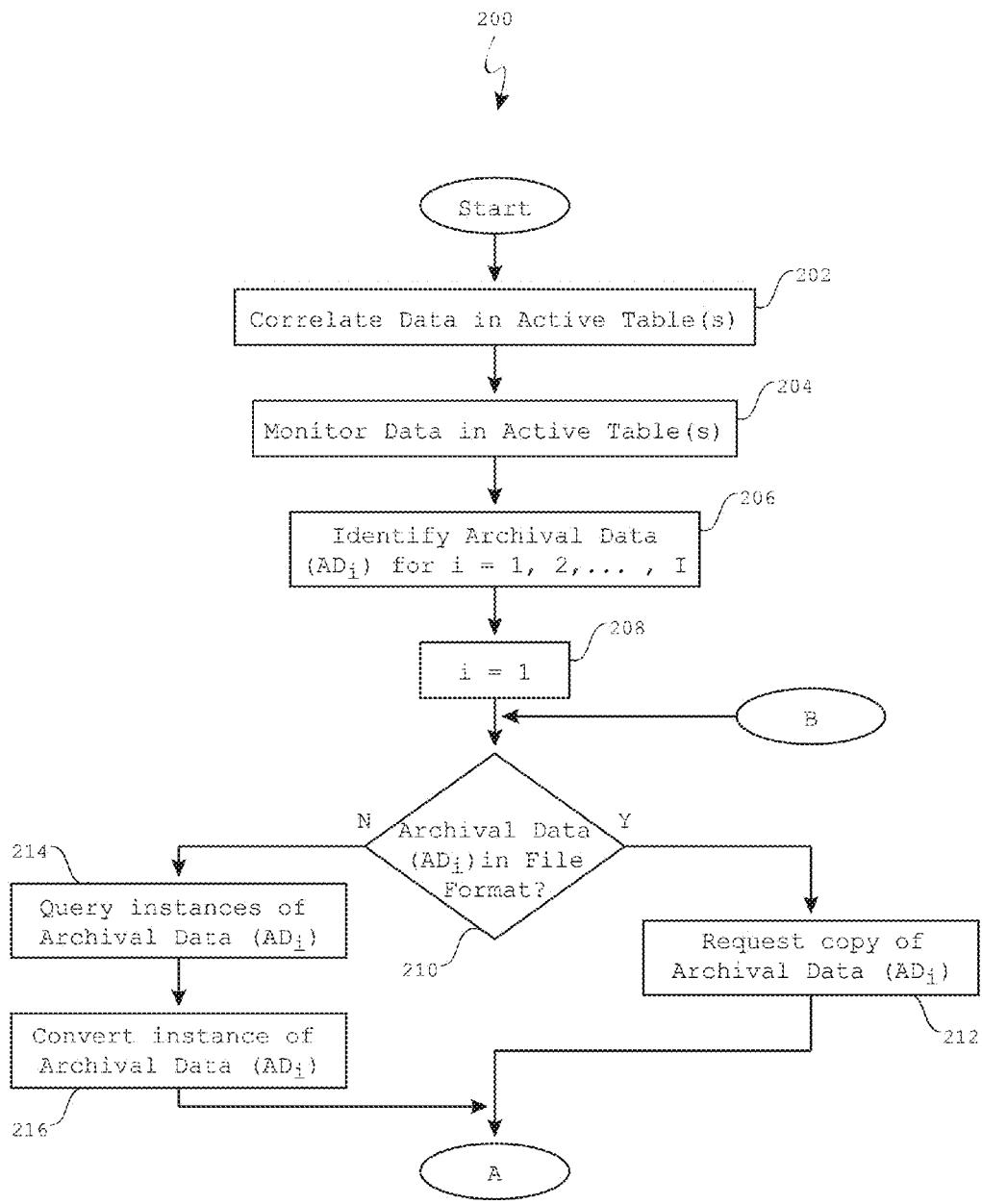
FIG. 2A and FIG. 2B (collectively referred to as FIG. 2) illustrates a method for archiving to a single database table information located across multiple tables, in accordance with embodiments of the present invention.
Figure 2B:
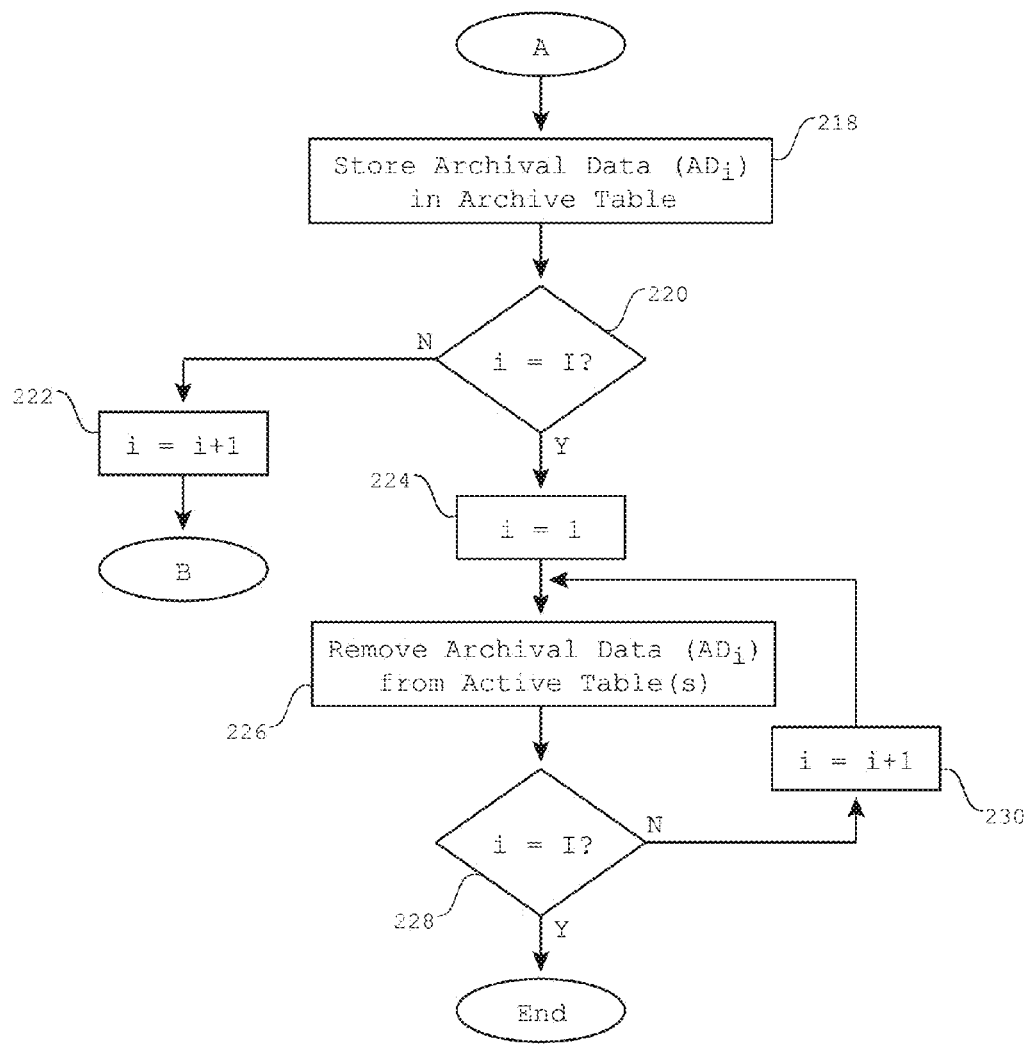

FIG. 2A and FIG. 2B (collectively referred to as FIG. 2) illustrates a method 200 for archiving to a single database table information located across multiple tables, in accordance with embodiments of the present invention. The method 200 begins with step 202 which comprises correlating data in the active tables.

Step 202 comprises correlating data in the active tables. The correlation between active tables 102 through 108 (see FIG. 1, supra) is necessary in that it allows the present invention can properly query information pursuant to step 214 (see FIG. 2, infra). In one embodiment of the present invention, an end user identifies the correlations between the active tables 102 through 108 (see FIG. 1, supra).

In another embodiment of the present invention, the method 200 parses all active tables 102 through 108 to determine the relationships between data values. After completion of step 202, the method 200 continues with step 204 which comprises monitoring data values in the active tables.

Monitoring data values in the active tables 102 through 108 (see FIG. 1, supra) may comprise, inter alia, monitoring the last time a given data value was accessed, monitoring the number of times a given data value was accessed within a specific period of time, monitoring the last time a given data value was modified, monitoring the number of times a given data value was modified within a specific period of time, monitoring the last time a given data value was written to an active table, monitoring the number of times a given data value was written to an active table within a specific period of time, monitoring the last time a given data value was moved within an active table, monitoring the number of times a given data value was moved within an active table within a specific period of time, etc.

In one embodiment of the present invention, step 204 continues to monitor the data values residing in the active tables 102 through 108 (see FIG. 1, supra) until the occurrence of an event. The event which occurs during step 204 may be, inter alia, the elapse of a specified period of time (e.g. hour, day, week, month, etc.), the frequency of queries to the active tables 102 through 108 exceeding/failing to exceed a first threshold, the period of time since the last query to the active tables 102 through 108 exceeding/failing to exceed a first threshold, etc. After the occurrence of the event, step 204 concludes and the method 200 continues with step 206 which comprises identifying archival data $AD_i$ for I=1, 2, . . . , I.

Step 206 comprises identifying archival data $AD_i$, where I is an integer corresponding to the total number of data values identified as archival data. The identified archival data represents data values residing in the active tables 102 through 108 (see FIG. 1, supra) which exceeded/failed to exceed a second threshold.

In one embodiment of the present invention, an end user prior to step 206 provides the second threshold value. In another embodiment of the present invention, the second threshold value is statically set prior to implementation of the method 200. In another embodiment of the present invention, the second threshold value is variably set prior to implementation of step 206. In yet another embodiment of the present invention, the second threshold value is dynamically set based on previous instances of the method 200.

The second threshold value may represent, inter alia, the last time a given data value was accessed, the number of times a given data value was accessed within a specific period of time, monitoring the last time a given data value was modified, the number of times a given data value was modified within a specific period of time, the last time a given data value was written to an active table, the number of times a given data value was written to an active table within a specific period of time, the last time a given data value was moved within an active table, the number of times a given data value was moved within an active table within a specific period of time, etc.

After identifying archival data $AD_i$ for i=1, 2, . . . , I, step 206 concludes and the method 200 sets index I to 1 (i.e. i=1) pursuant to step 208 and continues with step 210 which comprises determining whether archival data value $AD_i$ is in a proper format.

Determining whether the archival data ($AD_i$) is in a proper format requires identifying whether the archival data is either a single file or a combination of at least one data value. If the archival data ($AD_i$) is a single file (e.g. doc, pdf, jpeg, txt, csv, etc.) then step 210 returns a response 'yes' and the method 200 continues with step 212 which comprises requesting a copy of the archival data ($AD_i$).

If however, the archival data ($AD_i$) is not a single file but rather it is a combination of at least one data value, then step 210 returns a response 'no' and the method 200 continues with step 214 which comprises querying the active tables 102 through 108 (see FIG. 1, supra) for all combinations of data values having said archival data ($AD_i$) present.

Step 212 comprises requesting a copy of the archival data ($AD_i$). Upon receipt of the single file representing the archival data ($AD_i$), step 212 is complete and the method 200 continues with step 218 which comprises storing the archival data ($AD_i$) in a archive table 112 (see FIG. 1, supra).

Step 214 comprises querying the active tables 102 through 108 (see FIG. 1, supra) for all combinations of data values having said archival data (AD) present. Since the archival data ($AD_i$) will be removed from the active table in which it resides, all combinations of data values where said archival data ($AD_i$) is present must be stored in the archival table 112 (see FIG. 1, supra).

For example, using the data values in FIG. 1, supra, if data value 'A' was identified as archival data ($AD_i$), then all combinations comprising data value 'A' would be queried pursuant to step 214. If data value 'A' is present in combination 'ABCD', 'AEFG' and 'AHIJ', then all three combinations of data values would be queried.

After completion of step 214, the method 200 continues with step 216 which comprises converting each of the queried results of step 216 into a single file 110 (see FIG. 1, supra).

In one embodiment of the present invention, the file format for the queried results is a portable document format (PDF) for pdf files are capable of representing two-dimensional documents in a manner independent of application software, hardware, and/or operating systems.

Thus, for each combination returned which comprises the archival data ($AD_i$), the returned information is converted into a single file 110 (e.g. pdf file; see FIG. 1, supra). After completion of step 216, the method 200 continues with step 218 which comprises storing the archival data ($AD_i$) in a archive table 112 (see FIG. 1, supra).

Step 218 comprises storing the archival data (AD) in a archive table 112 (see FIG. 1, supra). In one embodiment of the present invention the archival data ($AD_i$) is stored as the single file (regardless of whether the file originated from step 212 or 216) in the archive table 112 (see FIG. 1, supra) as a blob file type.

The blob file type is preferred for it does not take into account the formatting of the file contained therein. If the single file 110 originates from step 216 then it is clear that said single file 110 is of a file type pdf (see FIG. 1, supra). However, if the single file 110 is a result of step 212, the requested file may be in a format different form pdf. Storing the single file 110 in as a blob file type in the archive table 112 accommodates any file type and is the preferred file type.

In another embodiment of the present invention, the blob file type is therein encrypted to ensure only properly authenticated end users have access to the archival data ($AD_i$). The encryption protocol may include Java Cryptography Extension (JCE).

After storing archival data ($AD_i$) in the archive table 112 (see FIG. 1, supra), step 218 ends and the method 200 continues with step 220 which determines if index i is equal to I.

If index i is equal to I, meaning all archival data ($AD_i$ for i=1, 2, . . . , I) was retrieved and stored in the archive table 112, then step 220 returns a response 'yes' and the method 200 continues by resetting index i to one (i.e. i=1) pursuant to step 224 and continuing with step 226 which comprises removing archival data ($AD_i$) from the active tables 102 through 108 (see FIG. 1, supra).

However, if index i is not equal to I, meaning all archival data ($AD_i$ for i=1, 2, . . . , I) has yet to be retrieved and stored in the archive table 112, the step 220 returns a response 'no' and the method 200 increments index i by one (i.e. i=i+1) pursuant to step 222 and returns to step 208 to perform steps 208 through 220 again with the next archival data value ($AD_i$).

Step 226 comprises removing archival data ($AD_i$) from the active tables 102 through 108 (see FIG. 1, supra). After removing archival data ($AD_i$) from the active tables 102 through 108 (see FIG. 1, supra), step 226 ends and the method continues with step 228 which determines if index i is equal to I.

If index i is equal to I, meaning all archival data ($AD_i$ for i=1, 2, . . . , I) was removed from the active tables 102 through 108, then step 228 returns a response 'yes' and the method 200 ends.

However, if index i is not equal to I, meaning all archival data ($AD_i$ for i=1, 2, . . . , I) has not been removed from the active tables 102 through 108, the step 228 returns a response 'no' and the method 200 increments index i by one (i.e. i=i+1) pursuant to step 230 and returns to step 226 to perform steps 226 through 228 again with the next archival data value ($AD_i$).

Figure 3:
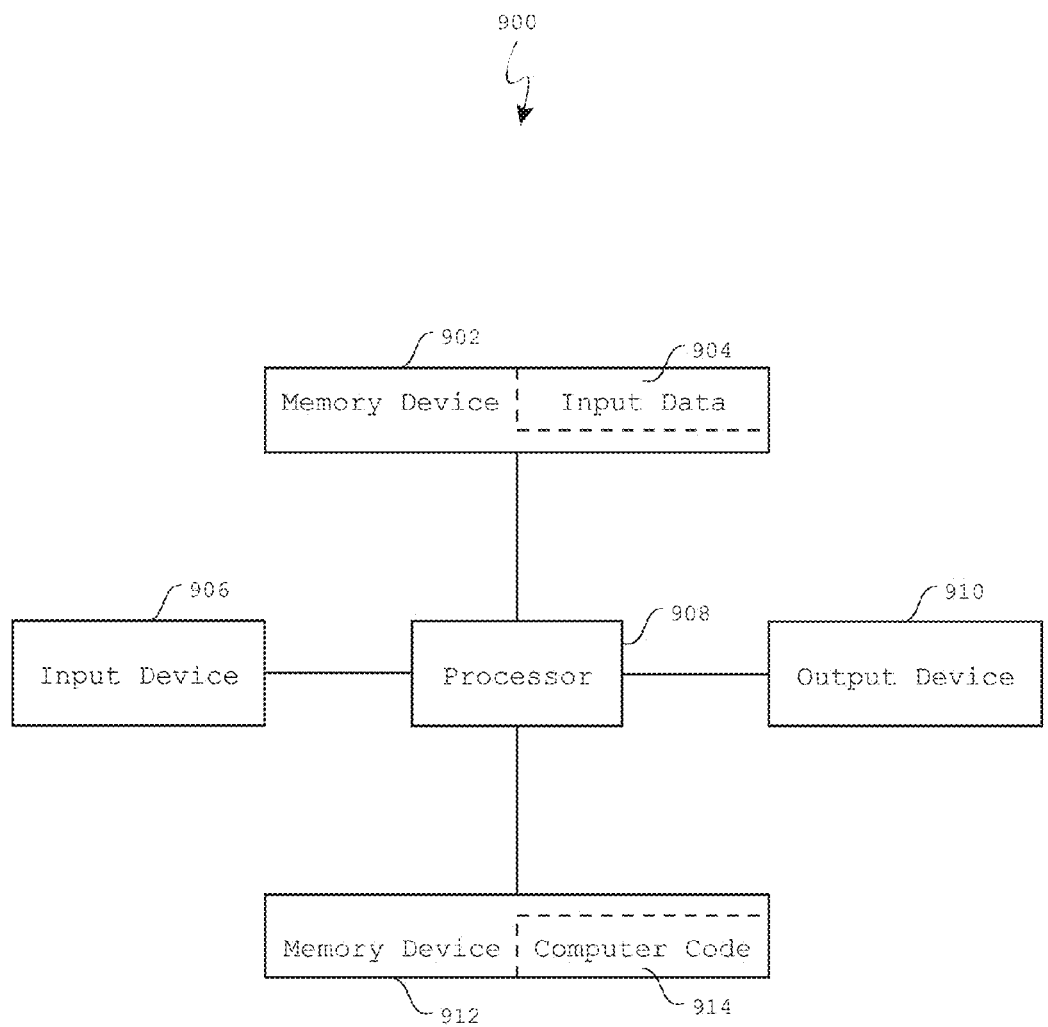
FIG. 3 illustrates a computer system which facilitates a method for archiving to a single database table information located across multiple tables, in accordance with embodiments of the present invention.

FIG. 3 illustrates a computer system 900 which facilitates a method for method for archiving to a single database table information located across multiple tables, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for archiving to a single database table information located across multiple tables according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for archiving to a single database table information located across multiple tables. Thus, the present invention discloses a process for supporting computer infrastructure, comprising integrating, hosting, maintaining and deploying computer-readable code into a computing system (e.g., computing system 900), wherein the code in combination with the computing system is capable of performing a method for archiving to a single database table information located across multiple tables.

In another embodiment, the invention provides a business method that performs the process steps of the invention on a subscription, advertising and/or fee basis. That is, a service provider, such as a Solution Integrator, can offer to create, maintain, support, etc. a process for archiving to a single database table information located across multiple tables. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 900 as a particular configuration of hardware and software, any configuration of hardware and software, as would be known to a person of ordinary skill in the art, may be utilized for the purposes stated supra in conjunction with the particular computer system 900 of FIG. 3. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for archiving to a single database table information located across multiple database tables, said method comprising:

receiving, by a processor from an end user, a threshold number of times specified by the end user and a period of time specified by the end user;

identifying, by the processor, at least one archival data value in an archive table, said single database table being the archive table, said archive table being a set of data values organized using columns and rows, said set of data values being only readable and not modifiable, said data values including the at least one archival data value, each archival data value of the at least one archival data value corresponding to a unique data value of at least one data value residing in a table of the multiple database tables;

determining, by the processor, that the specified threshold number of times has not been exceeded, within the specified period of time, by a number of times each archival data value has been moved within the multiple database tables;

storing, by the processor, at least one archive file in the single database table, each archive file of the at least one archive file comprising the at least one archive data value.

2. The method of claim 1, said method further comprising:

removing, by the processor, from the multiple database tables each archival data value of the at least one archival data value.

3. The method of claim 1, each table of the multiple database tables being an active table.

4. The method of claim 1, said storing further comprising:

encrypting, by the processor, each archive file of the at least one archive file, said encrypting being in such a way that only an authenticated end user may access the at least one archive file, said encrypting being performed prior to said storing each the archival file in the single database table.

5. The method of claim 4, said storing further comprising:

determining, by the processor, that the at least one archive value contains a file extension; and responsive to said determining, retrieving, by the processor, the at least one archive value from the multiple database tables, said determining and said retrieving being performed prior to said storing each said archival file in the single database table.

6. The method of claim 4, said storing further comprising:

determining, by the processor, that the at least one archive value does not contain a file extension;

responsive to said determining, querying, by the processor, the multiple database tables for all records containing the at least one archive value; and converting, by the processor, each record of said all records to a archive file having a portable document format (PDF) file extension, said determining and said querying and said converting being performed prior to said storing each said archival file in the single database table.

7. The method of claim 1, said multiple database tables comprising discrete data values, said method further comprising:

monitoring, by the processor, a number of times the given data value has been moved within the active table within the specified period of time.

8. A computer program product, comprising:

a computer readable hardware storage device having a computer-readable program code stored therein, said computer-readable program code containing instructions that when executed by a processor of a computer system implement a method for archiving to a single database table information located across multiple database tables, said method comprising:

receiving, by the processor from an end user, a threshold number of times specified by the end user and a period of time specified by the end user;

identifying, by the processor, at least one archival data value in an archive table, said single database table being the archive table, said archive table being a set of data values organized using columns and rows, said set of data values being only readable and not modifiable, said data values including the at least one archival data value, each archival data value of the at least one archival data value corresponding to a unique data value of at least one data value residing in a table of the multiple database tables;

determining, by the processor, that the specified threshold number of times has not been exceeded, within the specified period of time, by a number of times each archival data value has been moved within the multiple database tables;

storing, by the processor, at least one archive file in the single database table, each archive file of the at least one archive file comprising the at least one archive data value.

9. The computer program product of claim 8, said method further comprising:

removing, by the processor, from the multiple database tables each archival data value of the at least one archival data value.

10. The computer program product of claim 8, each table of the multiple database tables being an active table.

11. The computer program product of claim 8, said storing further comprising:

encrypting, by the processor, each archive file of the at least one archive file, said encrypting being in such a way that only an authenticated end user may access the at least one archive file, said encrypting being performed prior to said storing each the archival file in the single database table.

12. The computer program product of claim 11, said storing further comprising:

determining, by the processor, that the at least one archive value contains a file extension; and responsive to said determining, retrieving, by the processor, the at least one archive value from the multiple database tables, said determining and said retrieving being performed prior to said storing each said archival file in the single database table.

13. The computer program product of claim 11, said storing further comprising:

determining, by the processor, that the at least one archive value does not contain a file extension;

responsive to said determining, querying, by the processor, the multiple database tables for all records containing the at least one archive value; and converting, by the processor, each record of said all records to a archive file having a portable document format (PDF) file extension, said determining and said querying and said converting being performed prior to said storing each said archival file in the single database table.

14. The computer program product of claim 8, said multiple database tables comprising discrete data values, said method further comprising:

monitoring, by the processor, a number of times the given data value has been moved within the active table within the specified period of time.

15. A computing system, comprising:

a processor coupled to a computer-readable memory unit, said memory unit comprising a software application, said software application comprising instructions that when executed by the processor, implement a method for archiving to a single database table information located across multiple database tables, said method comprising:

receiving, by the processor from an end user, a threshold number of times specified by the end user and a period of time specified by the end user;

identifying, by the processor, at least one archival data value in an archive table, said single database table being the archive table, said archive table being a set of data values organized using columns and rows, said set of data values being only readable and not modifiable, said data values including the at least one archival data value, each archival data value of the at least one archival data value corresponding to a unique data value of at least one data value residing in a table of the multiple database tables;

determining, by the processor, that the specified threshold number of times has not been exceeded, within the specified period of time, by a number of times each archival data value has been moved within the multiple database tables;

storing, by the processor, at least one archive file in the single database table, each archive file of the at least one archive file comprising the at least one archive data value.

16. The computing system of claim 15, said method further comprising:

removing, by the processor, from the multiple database tables each archival data value of the at least one archival data value.

17. The computing system of claim 15, each table of the multiple database tables being an active table.

18. The computing system of claim 15, said storing further comprising:

encrypting, by the processor, each archive file of the at least one archive file, said encrypting being in such a way that only an authenticated end user may access the at least one archive file, said encrypting being performed prior to said storing each the archival file in the single database table.

19. The computing system of claim 18, said storing further comprising:

determining, by the processor, that the at least one archive value contains a file extension; and responsive to said determining, retrieving, by the processor, the at least one archive value from the multiple database tables, said determining and said retrieving being performed prior to said storing each said archival file in the single database table.

20. The computing system of claim 18, said storing further comprising:

determining, by the processor, that the at least one archive value does not contain a file extension;

responsive to said determining, querying, by the processor, the multiple database tables for all records containing the at least one archive value; and converting, by the processor, each record of said all records to a archive file having a portable document format (PDF) file extension, said determining and said querying and said converting being performed prior to said storing each said archival file in the single database table.

* * * * *